Nov. 8, 1966  E. L. BERANEK ETAL  3,283,459
PERFORATED GRAIN BIN FLOOR

Original Filed April 17, 1962  2 Sheets-Sheet 1

INVENTORS.
Emil L. Beranek
Ronald J. Wilson
BY Scofield, Kolger, Scofield & Lowe
ATTORNEYS.

Nov. 8, 1966     E. L. BERANEK ETAL     3,283,459
PERFORATED GRAIN BIN FLOOR
Original Filed April 17, 1962     2 Sheets-Sheet 2

INVENTORS.
Emil L. Beranek
Ronald J. Wilson
BY
Scofield, Kobya, Scofield
& Lowe
ATTORNEYS.

United States Patent Office 3,283,459
Patented Nov. 8, 1966

3,283,459
PERFORATED GRAIN BIN FLOOR
Emil L. Beranek, Lincoln, Nebr., and Ronald J. Wilson, Independence, Mo., assignors to Butler Manufacturing Company, a corporation of Missouri
Continuation of application Ser. No. 188,071, Apr. 17, 1962. This application Apr. 15, 1965, Ser. No. 451,678
3 Claims. (Cl. 52—263)

This is a continuation of application Serial No. 188,071, filed April 17, 1962 entitled "Perforated Grain Bin Floor" now abandoned.

This invention relates to perforated floors for grain bins and refers more particularly to an improved joint for such floors.

Perforated floors for grain bins are used where it is desired to pass heated air upwardly through the grain mass. In the past, such floors have comprised pie-shaped perforated plates supported by radiating beams and overlapping one another and connected with bolts. The joints in such conventional floors have long proved a problem since they establish projections which interfere with scooping of grain from the bin. Moreover, assembly of such an arrangement is a tedious job as many, many screws and bolts are required.

An object of the instant invention is to provide an improved joint for perforated floors for grain bins.

Another object of the invention is to provide an improved floor for grain bins wherein the joint structure does not have an overlapping connection whereby to obviate the presence of projections which would interfere with scooping of grain from the bin, and the use of unloading equipment such as rotary auger bin unloaders.

Another object of the invention is to provide an improved joint for perforated floors for grain bins which permits easy, quick assembly and disassembly of the floor without use of screws or bolts at the joint.

Another object of the invention is to provide an improved joint for perforated floors for grain bins, which joint, assembled, is extremely strong and rigid, although cheap to manufacture and produce and assemble and disassemble.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Figure 1:
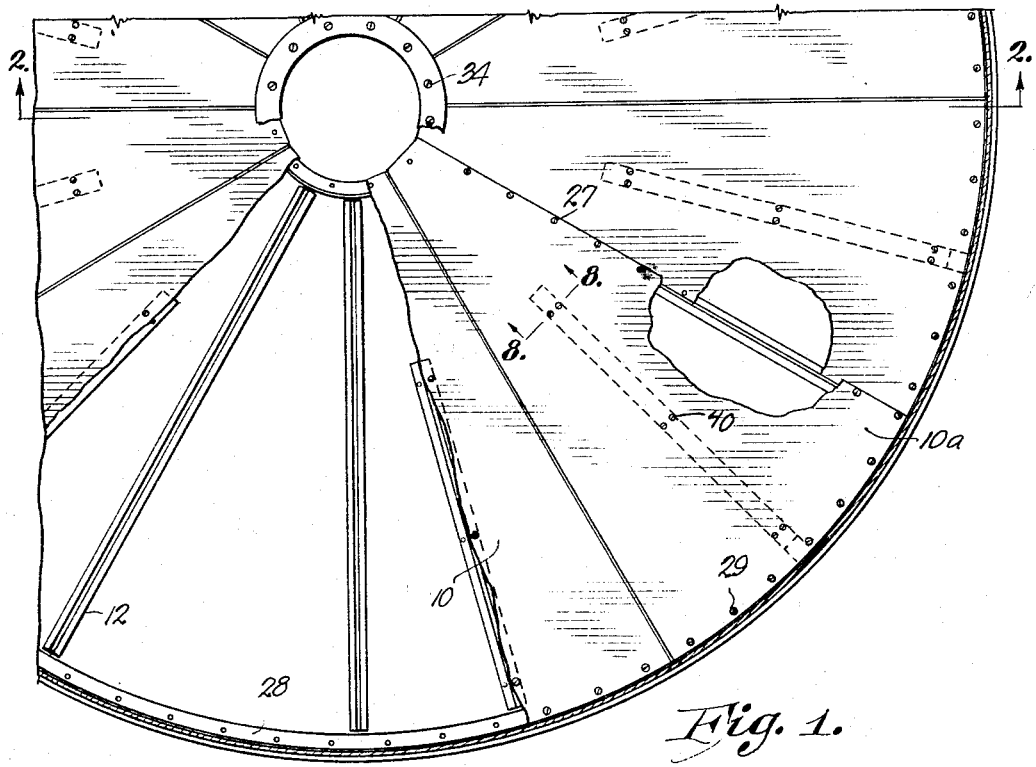
FIG. 1 is a plan view of a portion of the improved perforated grain bin floor and joint with parts cut away to better illustrate the construction thereof.
Figure 2:
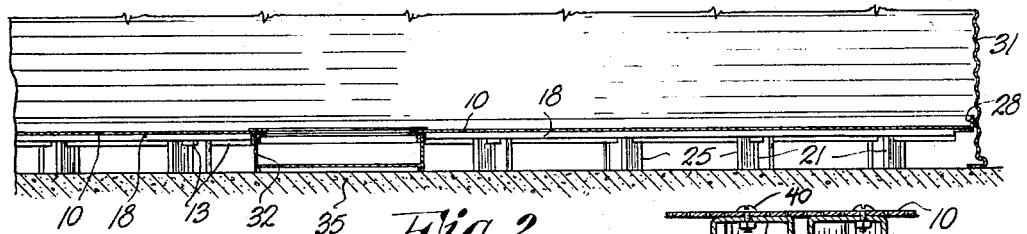
FIG. 2 is a view taken along the line 2—2 of FIG. 1 in the direction of the arrows.

Referring to the drawings, the floor members illustrated comprise elongate flat perforated sheets 10 which each comprise a sector of the circular floor, each sheet tapering from a greater width outwardly to a lesser width inwardly. The side edges of the sheet are, in each case except one edge of one sheet designated 10a, downwardly turned to form right-angled flanges 11, which flanges run along substantially the entire length of the side edges of the sector members.

Figure 6:
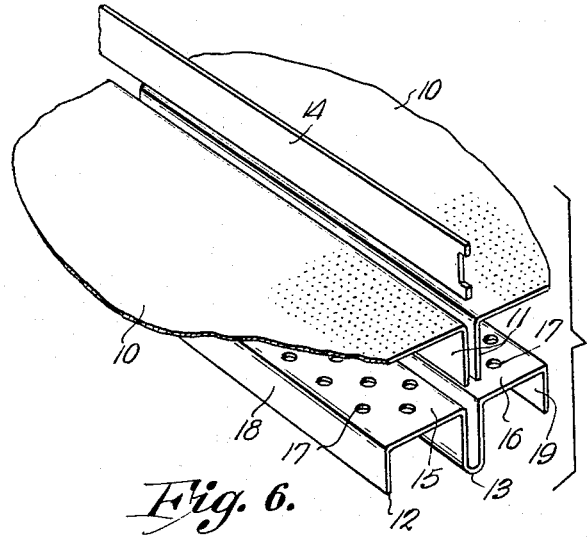
FIG. 6 is a perspective view from above of the upper elements of the floor joint in exploded relationship.

Flanges 11 of floor sheets 10 are received in supporting trough members generally designated 12 (see FIG. 6) which extend radially substantially the entire length of the sheets 10 as seen in the lower left-hand portion of FIG. 1. Trough members 12 have a trough portion 13 of greater depth than flanges 11 and alternatively of a width (a) only slightly greater than two-flange thicknesses to compress same therein or (b) slightly greater in width than two flanges whereby to permit insertion between the flanges of wedging strip 14 of a material such as steel. Strips 14 have notched ends for easier removal by prying. The trough members 12 are substantially T-shaped in transverse section with the trough comprising the leg of the T and the elongate horizontal strips 15 and 16 comprising the arms of the T. Strips 15 and 16 may have perforations 17 therein, if desired and preferably have downwardly turned outer edges or flanges 18 and 19 thereon for a purpose to be described.

Figure 5:
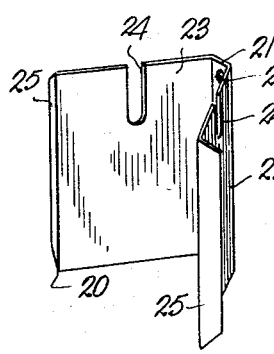
FIG. 5 is an enlarged perspective detail of the support column employed in the grain bin floor joint.
Figure 7:
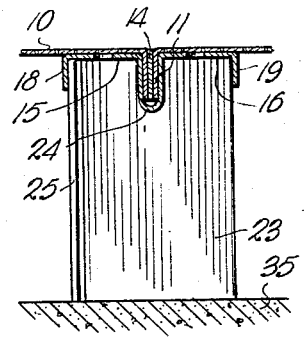
FIG. 7 is a view taken along the line 7—7 of FIG. 4 in the direction of the arrows.

Referring particularly to FIG. 5, and also to FIG. 7, a plurality of supporting columns generally designated 20 are provided to space trough members 12 and sheets 10 above the floor of the grain bin or the like. Supporting columns 20 must be suitably notched to receive therein trough 13 of trough member 12. A preferred form of column member is shown in FIGS. 5 and 7 which is V-shaped in horizontal section with a base 21 of the V adapted to be bolted by bolts 22 to a flange 18 or 19 and legs 23 having notches 24 therein. Legs 23 preferably have outwardly angled ends or flanges 25 thereon. The end edges of the latter are preferably beveled as seen in FIG. 5.

In assembly of the floor, the interrelationship of the sheets, wedging strip, support trough members and supporting column members are best seen in FIG. 7, wherein the troughs 13 fit into congruent notches 24 with flanges 18 and 19 lying against the ends of legs 23 and base 21.

Additionally, one of the floor sheets, 10a has bolt holes in a nondownwardly turned edge thereof whereby to be securable to the adjacent sheet and the said supporting trough member by screws 27. Thus it is seen that all bolt connections as in the conventional floors are eliminated except at the last joint.

Figure 8:
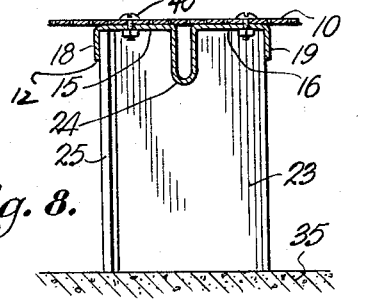
FIG. 8 is a view taken along the line 8—8 of FIG. 1 in the direction of the arrows.
Figure 3:
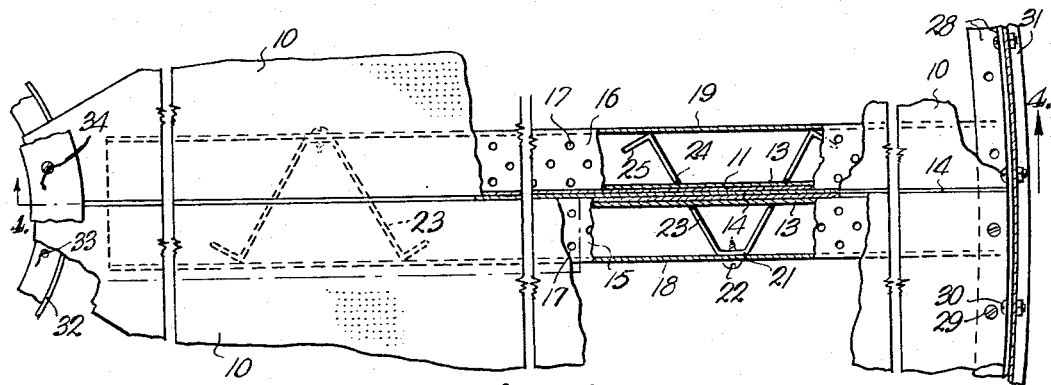
FIG. 3 is an enlarged detail in vertical plan of the joint of the perforated grain bin with parts cut away and shown in dotted lines to better illustrate the construction of the joint.
Figure 4:
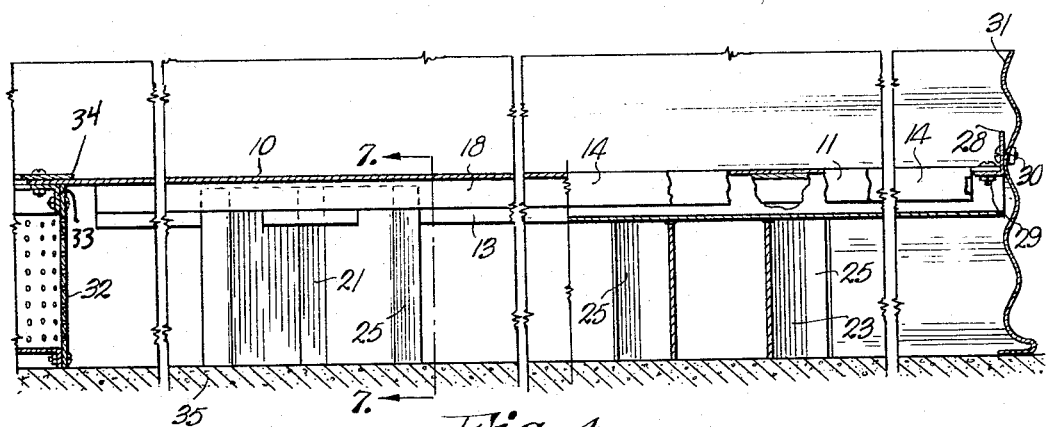
FIG. 4 is a view taken along the line 4—4 of FIG. 3 in the direction of the arrows.

It should be noted that there are two sizes of beams or trough and column members employed to support the sheets 10. The longer beam has just been described wherein the troughs 12 extend substantially the radial length of the sheets. Additionally, there are provided short beams intermediate the edges of each sheet bolted to the underside of said sheets. Thus, referring particularly to FIGS. 1 and 8, it may be seen there that shorter trough members 12 are bolted by bolts 40 through openings provided in the sheets 10 with columns supporting same in the manner shown in FIG. 7 for the length of said troughs. The only difference between the mounting of FIGS. 7 and 8 is that, in FIG. 7, the downwardly turned side edges of the sheets 10 fit into the notches 24, which is not the case in the center sheet connection illustrated in FIG. 8. This center support prevents downward bowing of the floor sheets under load and permits the use of less rigid material in the construction of sheets 10. This additionally saves weight.

In a typical outer wall construction, circumferential angles 28 are bolted by screws or bolts 29 to the periphery of sheets 10. Flanges 11 and wedges 14 are relieved peripherally whereby to permit engagement of sheets 10 with angles 28 adjacent the periphery of each of said sheets. Bolts 30 attach a conventional corrugated sheet 31 to the upwardly extending face of angle 28.

A hollow center is provided for the floor by means of perforated vertical flange 32, circular in form in horizontal section. Circular angle 33 is bolted by bolts to the undersides of the sheet 10 and the upper inside edge of flange 32. Cover ring 34 is secured over the inner edges of sheet 10. Flanges 11 are relieved inwardly for this purpose also. The entire floor assembly may be received on a typical concrete foundation 35.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A floor supporting joint construction comprising a pair of elongate flat metal sheets,
   each said sheet tapering from a greater width outwardly to a lesser width inwardly thereof,
   each said sheet having at least one down turned elongate side edge thereon extending substantially normal thereto,
   an elongate trough member T-shaped in transverse cross section receiving therewithin, in substantial parallel, side face, flat abutting relationship, the down turned elongate side edges of said pair of sheets along the substantial length of the abutting down turned edges thereof,
   and a plurality of floor panel supporting column members spaced at intervals along and under said panel side edge joint,
   said column members being V-shaped in horizontal section, the members having aligned grooves in the upper surface each receiving the lower outer surface portion of said trough member in engaging position fixing fashion therewithin.

2. A floor supporting joint construction comprising a pair of elongate flat metal sheets,
   each said sheet tapering from a greater width outwardly to a lesser width inwardly thereof,
   each said sheet having at least one down turned elongate side edge thereon extending substantially normal thereto,
   an elongate trough member receiving therewithin, in substantial parallel, side face, flat abutting relationship, the down turned elongate side edges of said pair of sheets along the substantial length of the abutting down turned edges thereof,
   said elongate trough member T-shaped in transverse cross section with the trough located in the leg of the T and the arms of the T each underlying and in elongate flat facing contact with one of said sheets,
   and a plurality of floor panel supporting column members spaced at intervals along and under said panel side edge joint,
   said column members centrally grooved across the upper surface thereof and each receiving the under surface of one of said T arms on the top surface thereof and the leg of the T in engaging position fixing fashion within the groove thereof,
   the elongate side edges of the T arms of the trough members having downwardly turned flanges connected thereto extending substantially normal thereto said flanges lying alongside the vertical sides of said columns in position fixing relationship therefor.

3. A construction as in claim 2 including means fixing said T arm side flanges to said column sides.

References Cited by the Examiner

UNITED STATES PATENTS 2,901,960  9/1959  Barre et al. _____ 52—510 X

FOREIGN PATENTS 4,374  12/1875  Great Britain.

FRANK L. ABBOTT, *Primary Examiner.*

L. R. RADANOVIC, J. E. MURTAGH,
*Assistant Examiners.*